(12) United States Patent
Kachel

(10) Patent No.: US 9,868,375 B1
(45) Date of Patent: Jan. 16, 2018

(54) RECEPTACLE FOR VEHICLES

(71) Applicant: James Kachel, Semmes, AL (US)

(72) Inventor: James Kachel, Semmes, AL (US)

( * ) Notice: Subject to any disclaimer, the term of this patent is extended or adjusted under 35 U.S.C. 154(b) by 0 days.

(21) Appl. No.: 15/360,448

(22) Filed: Nov. 23, 2016

(51) Int. Cl.
*B60N 3/08* (2006.01)

(52) U.S. Cl.
CPC ........................ *B60N 3/08* (2013.01)

(58) Field of Classification Search
CPC ......... B60N 3/08; B60N 2/6009; B60R 11/00; B60R 7/043
See application file for complete search history.

(56) References Cited

U.S. PATENT DOCUMENTS

| 2,771,127 | A | * | 11/1956 | Cole | ........................ | A47C 7/62 |
| | | | | | | 297/182 |
| 3,598,232 | A | * | 8/1971 | Trammell, Jr. | .......... | B60N 3/08 |
| | | | | | | 224/275 |
| 3,815,799 | A | * | 6/1974 | Trammell, Jr. | .......... | B60N 3/08 |
| | | | | | | 220/8 |
| 2008/0283565 | A1 | * | 11/2008 | Simon | ..................... | B60R 11/00 |
| | | | | | | 224/542 |
| 2010/0231010 | A1 | * | 9/2010 | Manley | ................ | B60N 2/6009 |
| | | | | | | 297/182 |
| 2014/0368005 | A1 | * | 12/2014 | Hackney | .................. | B60N 3/08 |
| | | | | | | 297/188.04 |

* cited by examiner

*Primary Examiner* — Corey Skurdal
(74) *Attorney, Agent, or Firm* — Adamsip, LLC; Gary N. Stewart; Stephen Thompson

(57) ABSTRACT

A receptacle for use with a vehicle is provided. The receptacle is designed to utilize the area between a vehicle's console and seat to secure a container suitable for receiving objects therein in a substantially fixed position within the vehicle. The receptacle has a container having an open end for receiving objects therein and an insert member removably secured to the container that holds the container in place within the vehicle. By utilizing the common features of a console and a seat, the receptacle accommodates most vehicles types and models and can be installed such that receptacle is accessible to a driver of a vehicle without obstructing driver movement during travel.

18 Claims, 3 Drawing Sheets

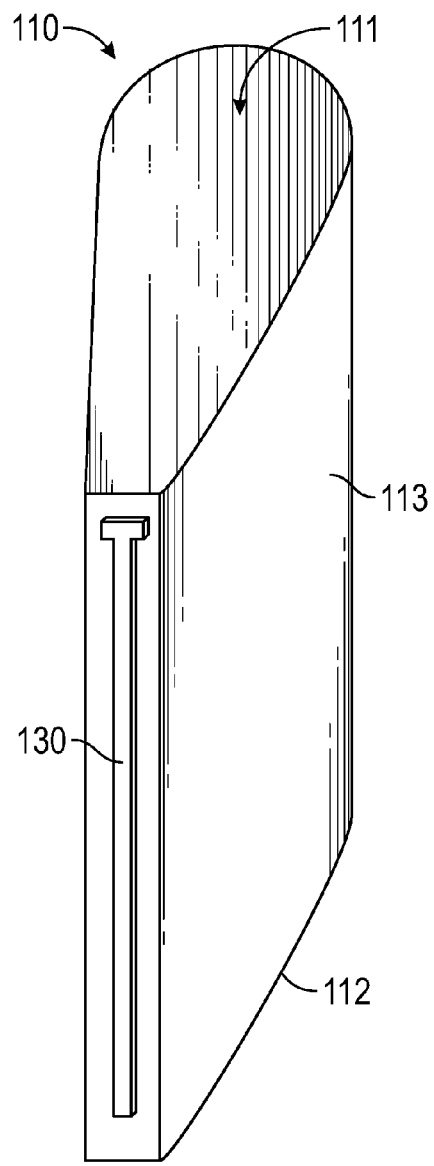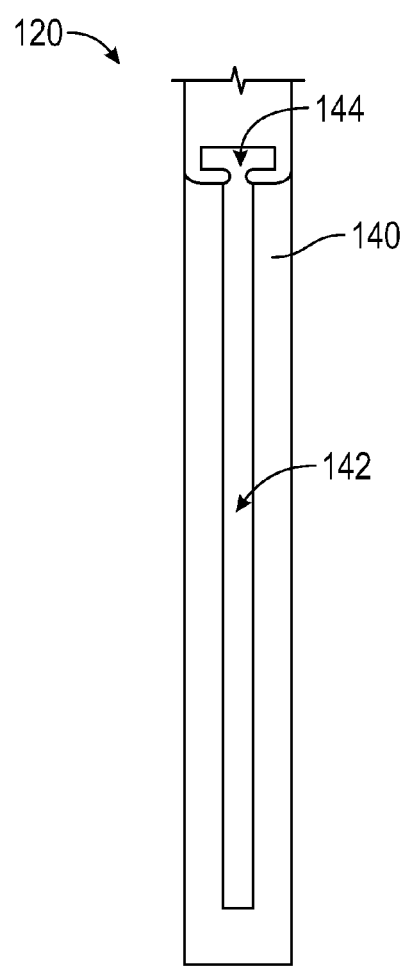
FIG. 3                    FIG. 4

RECEPTACLE FOR VEHICLES

FIELD OF INVENTION

The present invention refers generally to a receptacle device for use with a vehicle.

BACKGROUND

While traveling in a vehicle, individuals often accumulate various materials requiring disposal. Without the presence of a designated receptacle, such materials often end up in the floor or elsewhere within the vehicle, thus reducing usable space within the vehicle and dirtying the interior of the vehicle. Although a variety of vehicular receptacles are known in the art, such receptacles are often configured to attach to areas or features within a vehicle, such as the backside of a seat, that are inaccessible or inconvenient to the driver of the vehicle while traveling. Moreover, known receptacles that are accessible to the driver while traveling are often either configured to attach to features that are not present within newer vehicles, such as a window handle, or obstruct driver movement during travel.

Accordingly, a need exists in the art for a receptacle device for vehicles that is readily accessible to the driver of the vehicle while traveling. Furthermore, a need exists in the art for a receptacle for vehicles that achieves this end by utilizing features typically present within most vehicles and that does not obstruct driver movement during travel.

SUMMARY

In one aspect, a receptacle for use with a vehicle is provided. The receptacle is designed to utilize the area between a vehicle's console and seat to secure a container suitable for receiving objects therein in a substantially fixed position within the vehicle. Because most vehicles typically have a console and a seat therein, the receptacle can be installed in most vehicle types and models.

The receptacle comprises a container having an open end for receiving objects therein and an insert member secured thereto. In a preferred embodiment, the insert member is generally flat and substantially rigid. The insert member extends outwardly from the exterior of the container and is preferably configured in a generally vertical position when the receptacle is in an upright position. To hold the receptacle in place, the insert member is wedged between a vehicle's console and seat such that the insert member rests securely between the console and the seat once installed. By utilizing the area between a vehicle's console and seat to secure the receptacle's container in place, the receptacle can be installed such that it is accessible to a driver without obstructing driver movement during travel. For instance, in an automobile, a driver may wedge the insert member between the automobile's center console and passenger-side seat such that the container of the receptacle rests alongside the passenger side of the center console, thereby rendering the container of the receptacle accessible to the driver without obstructing the driver's freedom of movement.

In a preferred embodiment, the container is removably secured to the insert member. To removably secure the container to the insert member, the container preferably has a first interlocking member, and the insert member preferably has a second interlocking member. The first interlocking member and the second interlocking member are configured to interlock and thus removably secure the container to the insert member. The present disclosure also contemplates embodiments wherein the container and insert member may be permanently attached to one another. In another embodiment, the insert member has an anti-skid material attached thereto to further ensure that the insert member does not slide or shift after installation.

Additional features and advantages of the present disclosure will be set forth in the description which follows, and will be apparent from the description or may be learned by practice of the present disclosure. The foregoing general description and following detailed description are exemplary and explanatory and are intended to provide further explanation of the present disclosure.

DESCRIPTION OF THE DRAWINGS

These and other features, aspects, and advantages of the present disclosure will become better understood with regard to the following description, appended claims, and accompanying drawings where:

FIG. 3 shows a perspective view of a container embodying features consistent with the principles of the present disclosure.

FIG. 4 shows a partial perspective view of an insert member embodying features consistent with the principles of the present disclosure.

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components. The term "removably secured" and grammatical equivalents thereof are used herein to mean the joining of two components in a manner such that the two components are secured together, but may be detached from one another without requiring the use of specialized tools. The term "console" as used herein means any substantially rigid fixture within a vehicle positioned parallel to a seat within the vehicle. For instance, a console as referenced herein may include, but is not limited to, the center console present within an automobile that separates the driver-side portion of the vehicle from the passenger-side portion, an arm rest, the interior side of a vehicle's door, a vehicle's interior wall, a seat, or any other substantially rigid fixture within a vehicle positioned parallel to a seat within the vehicle.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
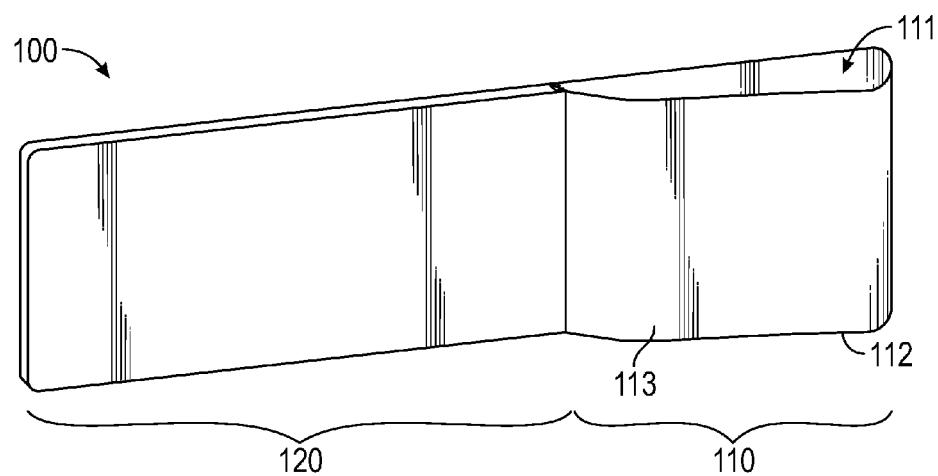
FIG. 1 shows a side perspective view of a device embodying features consistent with the principles of the present disclosure.

Turning now to the drawings, FIGS. 1-5 illustrate preferred embodiments of a receptacle device for use within a vehicle. In one aspect, a receptacle 100 for use with a vehicle's seat and console is provided. As shown in FIG. 1, the receptacle 100 has a container 110 configured to receive objects therein and an insert member 120 configured to secure the container 110 in a substantially fixed position. The insert member 120 extends outwardly from the exterior of the container 110. In a preferred embodiment, the insert member 120 is generally flat and is preferably configured in a generally vertical position when the receptacle 100 is in an upright position, as shown in FIG. 1. The insert member 120 is configured to wedge between a vehicle's seat 200 and console 210 such that the insert member 120 rests securely in place, thereby securing the container 110 in a substantially fixed position within the vehicle. Accordingly, the receptacle may be installed in vehicles including, but not limited to, automobiles, planes, trains, boats, helicopters, or any similar types of vehicles. However, it should be understood that the receptacle may be utilized in other settings wherein two objects are placed in a substantially close parallel configuration to each other such that the insert member 120 may be installed therein.

Figure 2:
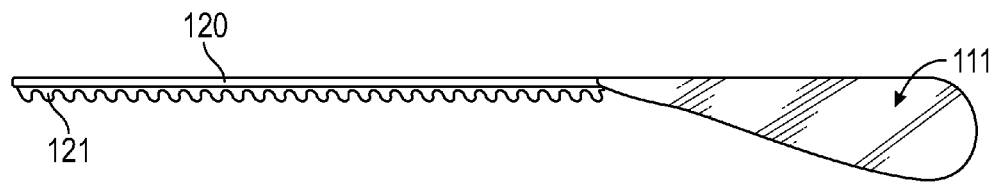
FIG. 2 shows a top plan view of a device embodying features consistent with the principles of the present disclosure.
Figure 5:
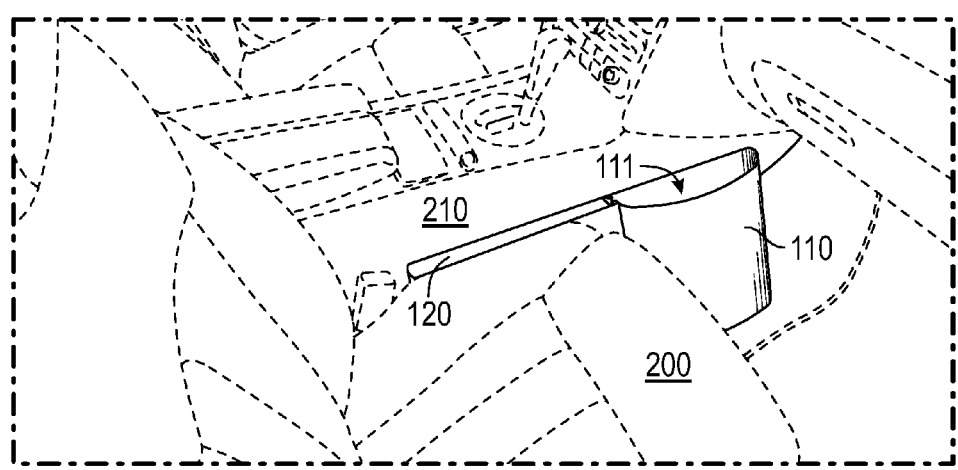
FIG. 5 shows a perspective view of a device embodying features consistent with the principles of the present disclosure, said device being installed in a vehicle.

As illustrated in FIGS. 1, 2, and 5, the receptacle 100 comprises a container 110 having an opening 111 configured to receive objects therein and an insert member 120. As illustrated in FIG. 5, the receptacle 100 can be installed in a vehicle by wedging the insert member 120 between a vehicle's seat 200 and console 210 such that the insert member 120 rests securely between the seat 200 and console 210. When installed, the insert member 120 supports the container 110 in an upright position, thereby preventing the container 110 from overturning and spilling the contents of the container 110.

In a preferred embodiment, the container 110 and the insert member 120 are configured such that the container 110 can be removably secured to the insert member 120. To removably secure the container 110 to the insert member 120, the container 110 preferably has a first interlocking member 130, and the insert member 120 preferably has a second interlocking member 140, as shown in FIGS. 3 and 4. The first interlocking member 130 and the second interlocking member 140 are compatible such that the first interlocking member 130 and the second interlocking member 140 can be interlocked to secure the container 110 to the insert member 120. In a preferred embodiment, the first interlocking member 130 is a male rod protruding from the exterior of the container 110, and the second interlocking member 140 has a female groove 142 with a top opening 144 and a lip on either side of the groove 142. The male rod 130 has a groove along each side of the rod and is configured to slide downward into the top opening 144 of the female groove 142, thereby interlocking the two parts. In an alternative embodiment, the male and female interlocking members may be reversed such that the container 110 has the female member and the insert member 120 has the male member. Additionally, it should be understood that any fastening or securing device suitable for removably securing one object to another object may be used to removably secure the container 110 to the insert member 120 including, but not limited to, snap buttons, hook and loop fasteners (e.g., Velcro), magnets, adhesive tapes, screws, nails, nuts and bolts, or any similar types of fasteners.

In a preferred embodiment, the container 110 is molded such that the first interlocking member 130 is self-contained within the container 110, and the insert member 120 is molded such that the second interlocking member 140 is self-contained within the insert member 120. The present disclosure also contemplates embodiments wherein either the first interlocking member 130 or the second interlocking member 140, or both, are attached to the container 110 and the insert member 120, respectively, instead of self-contained therein. Preferably, as illustrated ion FIGS. 3 and 4, the first interlocking member 130 substantially spans the height of the container 110 and the second interlocking member 140 substantially spans the height of the insert member 120.

Preferably, the first interlocking member 130 comprises a single member, as shown in FIG. 3, and the second interlocking member 140 comprises a single member, as shown in FIG. 4. The present disclosure also contemplates embodiments wherein either the first interlocking member 130 or the second interlocking member 140, or both, may comprise two or more members. For instance, the first interlocking member 130 may comprise two or more hook tape strips (male member of Velcro) and the second interlocking member 140 may comprise two or more loop tape strips (female member of Velcro).

In an alternative embodiment, the insert member 120 may be permanently attached to the container 110 such that the receptacle 100 is a unitary piece of material comprising the container 110 and the insert member 120.

FIG. 5 shows the receptacle 100 installed within a vehicle by utilizing the area between the seat 200 and the console 210 of the vehicle. A user may install the receptacle 100 in a vehicle by wedging the insert member 120 between the vehicle's seat 200 and console 210 until the insert member 120 rests securely in place. The user may install the receptacle 100 by first securing the container 110 to the insert member 120 and then wedging the insert member 120 between the seat 200 and the console 210 of the vehicle. Alternatively, the user may first install the insert member 120 between the seat 200 and console 210 and then secure the container 110 to the insert member 120. To secure the container 110 to the insert member 120, the bottom of the first interlocking member 130 of the container 110 is aligned with the top opening 144 of the groove 142 of the second interlocking member 140, which is located at one end of the insert member 120. The user then pushes the container 110 downward so that the first interlocking member 130 slides down into the groove 142 of the second interlocking member 140, thereby securing the container 110 to the insert member 120. To detach the container 110, the user lifts the container 110 upward until the interlocking members are disengaged. Detaching the container 110 allows the user remove the container 110 from a vehicle without having to remove the insert member 120 from between the seat 200 and console 210 of the vehicle. In this way, the receptacle 100 enables a user to easily remove the container 110 for purposes such as emptying or cleaning the container and then subsequently reinstall the container 110 within the vehicle.

To ensure the insert member 120 securely rests between a vehicle's seat 200 and console 210 without significant sliding or shifting, the insert member 120 is preferably at least one inch thick, though the insert member 120 may be any thickness suitable to allow the insert member 120 to fit between a vehicle's console 210 and seat 200 for installation. In a preferred embodiment, to further reduce sliding or shifting of the insert member 120 after installation, an anti-skid material 121 may be attached to the insert member 120, as shown in FIG. 2. Preferably, the anti-skid material 121 is attached to the insert member 120 such that the anti-skid material 121 is in contact with the side of the vehicle's seat 200 when the insert member 120 is installed. In a preferred embodiment, the anti-skid material 121 may comprise a serrated material, as shown in FIG. 2. In another embodiment, the insert member 120 may be made at least partially of an anti-skid material to prevent shifting or sliding. In a preferred embodiment, the insert member 120 is made of plastic. It is understood, however, that the insert member 120 may be made of any suitable material including, but not limited to, rubber, wood, metal, glass, or any combination thereof. The insert member 120 is preferably made of a dishwasher-safe material.

In a preferred embodiment, as shown in FIG. 1, the insert member 120 is substantially flat and configured in a vertical position so that the insert member 120 can be wedged into a generally vertical space between the seat 200 and console 210 of a vehicle. In addition, the insert member 120 is preferably substantially rigid. As used herein, the term "substantially rigid" means that the insert member 120 is sufficiently rigid such that the insert member 120 can be wedged between the seat 200 and console 210 of a vehicle and support the container 110 in an upright position when the receptacle 100 is installed. The insert member 120 may maintain its shape when wedged between a vehicle's seat 200 and console 210 but may have some flexibility such that the insert member 120 can bend to accommodate the specific contours of a particular vehicle's seat 200 or console 210 when installed in the vehicle.

In a preferred embodiment, as best seen in FIG. 1, the height of the insert member 120 is substantially the same height as the container 110. It should be understood, however, that the height of the insert member 120 may be varied. For instance, the insert member 120 may be an elongated rod wherein one end of the rod is removably secured or permanently attached to the exterior of the container 110. As shown in FIG. 1, the insert member 120 is preferably shaped such that the width of the insert member 120 is greater than the height of the insert member 120 in order to provide better support for the container 110.

As illustrated in FIGS. 1 and 3, in a preferred embodiment, the container 110 has a base 112 and a peripheral sidewall 113 extending upwardly from the base 112. The peripheral sidewall 113 preferably has at least one side that is substantially straight such that the insert member 120 and the straight section of sidewall 113 rest flush against the side of the console 210 of the vehicle, as shown in FIG. 5, when the receptacle 100 is installed. In the embodiment shown in FIG. 5, the container 110 and insert member 120 are configured for installing the receptacle 100 on the passenger side of the console 210. In another embodiment, the container 110 and insert member 120 may be configured for installing the receptacle 100 on the driver side of the console 210.

The width of the opening 111 of the container 110 preferably increases as the opening 111 extends farther away from the insert member 120, as best seen in FIGS. 1 and 2. In a preferred embodiment, the width of the opening 111 is no greater than about six inches in order to limit obstruction of driver or passenger movement.

In a preferred embodiment, the container 110 is made of plastic. However, it is understood that the container 110 may be made of any suitable material including, but not limited to, rubber, wood, metal, glass, or any combination thereof. The container 110 is preferably made of a dishwasher-safe material.

It is understood that versions of the invention may come in different forms and embodiments. Additionally, it is understood that one of skill in the art would appreciate these various forms and embodiments as falling within the scope of the present disclosure.

What is claimed is:

1. A receptacle comprising a container having an open end for receiving objects therein and an insert member removably secured to the container, wherein the insert member extends outwardly from the exterior of the container and is configured to support the container in an upright position when the insert member is wedged into a vertical space between a seat and a console of a vehicle, and wherein at least one side of the insert member has an anti-skid material attached thereto such that the anti-skid material reduces movement of the insert member within the vertical space between the seat and the console of the vehicle when the insert member is wedged into the vertical space.

2. The receptacle of claim 1, wherein the container has a base and a peripheral wall extending upwardly from the base.

3. The receptacle of claim 1, wherein the anti-skid material has a serrated surface.

4. The receptacle of claim 1, wherein the insert member is substantially the same height as the container.

5. The receptacle of claim 1, wherein insert member is substantially rigid.

6. The receptacle of claim 1, wherein the insert member is substantially flat and configured in a vertical position when the container is in an upright position.

7. The receptacle of claim 1, wherein the insert member is formed from a unitary piece of material.

8. A receptacle comprising:
 a container having an open end for receiving objects therein; and
 an insert member extending outwardly from the exterior of the container and configured to support the container in an upright position when the insert member is wedged into a vertical space between a seat and a console of a vehicle,
  wherein the container has a first interlocking member and the insert member has a second interlocking member, the first interlocking member and the second interlocking member being compatible such that the first interlocking member and the second interlocking member can be directly interlocked together to removably secure the container to the insert member.

9. The receptacle of claim 8, wherein the first interlocking member is self-contained within the container.

10. The receptacle of claim 8, wherein the second interlocking member is self-contained within the insert member.

11. The receptacle of claim 8, wherein the container has a base and a peripheral wall extending upwardly from the base.

12. The receptacle of claim 8, wherein at least one side of the insert member has an anti-skid material attached thereto such that the anti-skid material reduces movement of the insert member within the vertical space between the seat and the console of the vehicle when the insert member is wedged into the vertical space.

13. The receptacle of claim 8, wherein the insert member is substantially rigid.

14. The receptacle of claim 8, wherein the insert member is substantially flat and configured in a vertical position when the container is in an upright position.

15. The receptacle of claim 8, wherein at least one side of the insert member has a serrated surface such that the serrated surface reduces movement of the insert member within the vertical space between the seat and the console of the vehicle when the insert member is wedged into the vertical space.

16. A receptacle comprising a container having an open end for receiving objects therein and an insert member extending outwardly from the exterior of the container, wherein the insert member is configured to support the container in an upright position when the insert member is wedged into a vertical space between a seat and a console of a vehicle, wherein the container and insert member are permanently attached such that the insert member and the container form a unitary piece of material, and wherein at least one side of the insert member has an anti-skid material attached thereto such that the anti-skid material reduces movement of the insert member within the vertical space between the seat and the console of the vehicle when the insert member is wedged into the vertical space.

17. The receptacle of claim 16, wherein the insert member is substantially flat and configured in a vertical position when the container is in an upright position.

18. The receptacle of claim 17, wherein the anti-skid material has a serrated surface.

* * * * *